May 24, 1927.
R. W. KIRK
1,629,509
AUTOMOBILE BUMPER
Filed Aug. 28, 1925
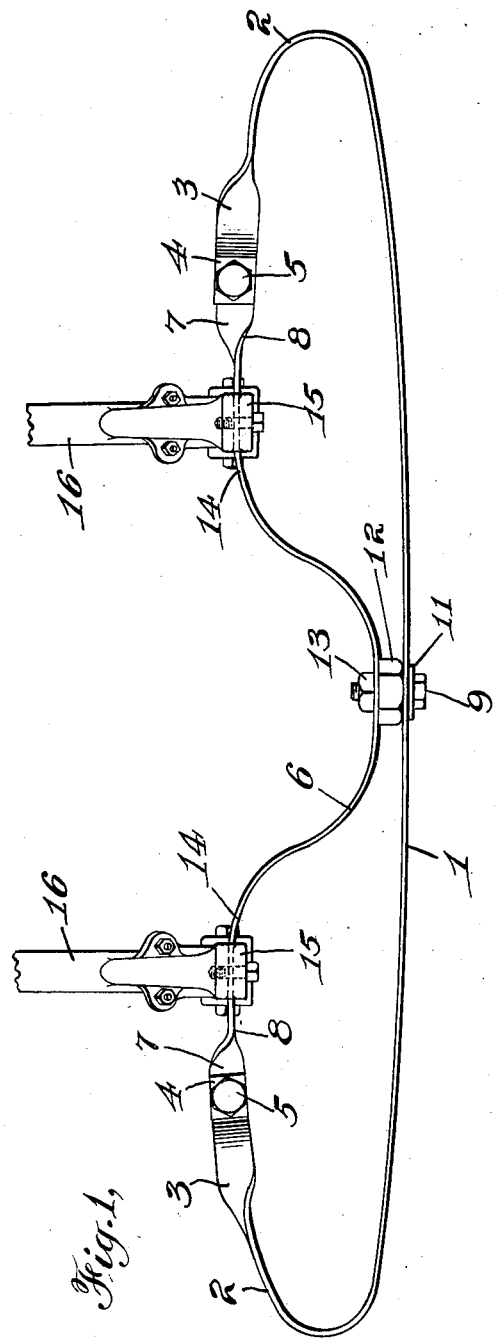
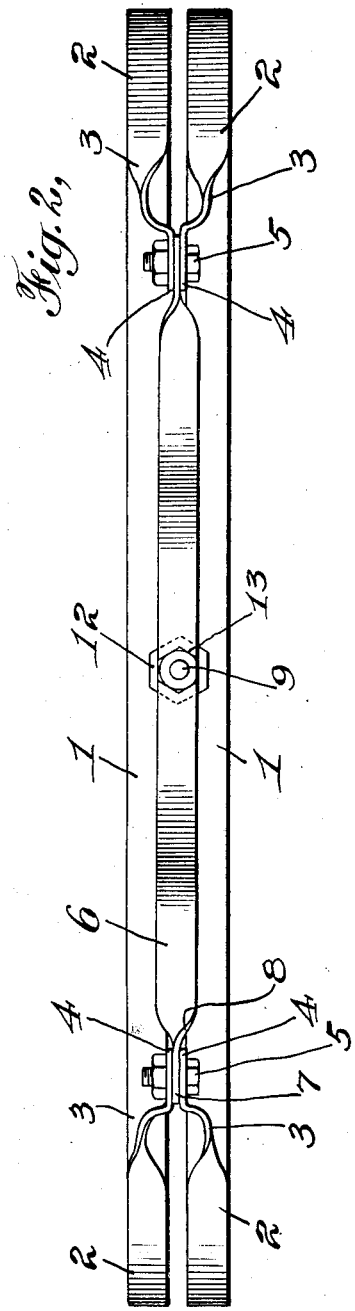
INVENTOR
Robert W. Kirk
BY
Frederick S. Duncan ATTORNEY Patented May 24, 1927.

1,629,509

UNITED STATES PATENT OFFICE.

ROBERT W. KIRK, OF ADRIAN, MICHIGAN, ASSIGNOR TO AMERICAN CHAIN COMPANY, INC., A CORPORATION OF NEW YORK.

AUTOMOBILE BUMPER.

Application filed August 28, 1925. Serial No. 53,015.

This invention relates to automobile bumpers, and is of particular utility when embodied in the construction of a bumper comprising main front bars of rectangular steel having their largest sectional dimension in a vertical plane, with similarly formed auxiliary or supplemental rear bars, although I contemplate the utilization of my improvements in any field for which they may be adapted by their nature.

An object of the invention is to connect the main front bars with each other, and also with the auxiliary or supplemental rear bar or bars, by giving the respective ends of the bars a quarter twist into parallel horizontal planes and fastening these quarter-twisted ends together by suitable means, such as bolts, rivets or clamps.

An inherent feature of advantage in this novel arrangement resides in the simplicity of manufacture, in contradistinction to the conventional method of making bumpers of similar shape by edge-bending the main bars, or by turning spring eyes at the joints or fastening together with lapping plates.

Referring to the drawings:

Figure 1 is a plan view of a bumper in the construction of which the improvements have been embodied, with supporting brackets therefor mounted on the horns of an automobile.

Figure 2 is a view of the bumper in rear elevation, insolated.

In the illustrated embodiment, the reference character 1 designates the main front bars of an automobile bumper of the double loop-end type, two such front bars being shown in vertical alignment, each bar being formed preferably of steel, rectangular in section, and having its largest dimension in a vertical plane, the bars having their ends bent upon themselves to form return portions 2 which in accordance with the invention are given a quarter twist at 3 respectively, and are brought together in parallel horizontal planes, the ends 4 being there fastened by suitable means such as the bolts 5.

Any suitable means may be provided for the support of the bumper, and in the instance illustrated an auxiliary or supplemental rear bar 6 is provided, of similar material and similarly fashioned, having a vertical portion intermediate its ends 7, the latter being given a quarter turn respectively at 8 into a plane parallel with that of the ends 4 and joined thereto by the bolts 5. The intermediate portion 6 is shown as connected to the main members 1 by a bend provided with a bolt 9 which transfixes the bar 6 and passes between the members 1, having preferably a washer 11 and nut 12 between which the members 1 are embraced, while a nut 13 serves to hold this connection in assembled order with the bar 6.

At 14 the rearward portions of the supplemental rear bar are shown as held by conventional clamps 15 mounted upon the front ends or horns 16 of an automobile frame, but any suitable support may be utilized, and the attachment of the bars to their support may be effected at the regions 4, by bolting thereto a similarly twisted attachment member or members (not shown), in conjunction with, or in place of, the auxiliary bar 6.

Instead of two front bars, there may be one or three or more, according to the style of bumper desired.

The supplemental rear bar may be formed with spring eyes at its ends, and the quarter bends of the main bars are then bolted above and below the spring eyes of the supplemental bar.

Having thus described my invention, I claim:

1. A bumper comprising a metal bar of rectangular cross-section, having its largest sectional dimension in a vertical plane, said bar having integral attachment portions twisted through ninety degrees.

2. A bumper comprising a plurality of metal bars of rectangular cross-section, having their largest sectional dimension in vertical planes, said bars respectively having portions twisted through ninety degrees into adjacent parallel planes and being there connected.

3. A bumper comprising a plurality of main front bars of metal, rectangular in cross-section and having their largest sectional dimension in parallel vertical planes, said bars respectively having portions twisted through ninety degrees into adjacent parallel planes and being there connected.

4. A bumper comprising main front bars of rectangular steel having their largest sectional dimension in parallel vertical planes, said bars respectively having portions twisted through ninety degrees into adjacent parallel planes and being there connected.

5. A bumper comprising a plurality of main front bars and an auxiliary bar, respectively formed of metal, rectangular in section and having their largest sectional dimension in parallel vertical planes, said bars respectively having portions twisted through ninety degrees into adjacent parallel planes and being there connected.

6. A bumper comprising a main front bar of metal, rectangular in cross-section and having its largest sectional dimension in a vertical plane, and a similarly fashioned auxiliary rear bar, said bars respectively having portions twisted through ninety degrees into adjacent parallel planes and being there connected.

7. A bumper comprising a plurality of main front bars of metal having their largest sectional dimension in parallel vertical planes, said bars respectively having portions bent into parallel horizontal planes and being there connected.

In witness whereof, I have signed this specification.

ROBERT W. KIRK.